UNITED STATES PATENT OFFICE.

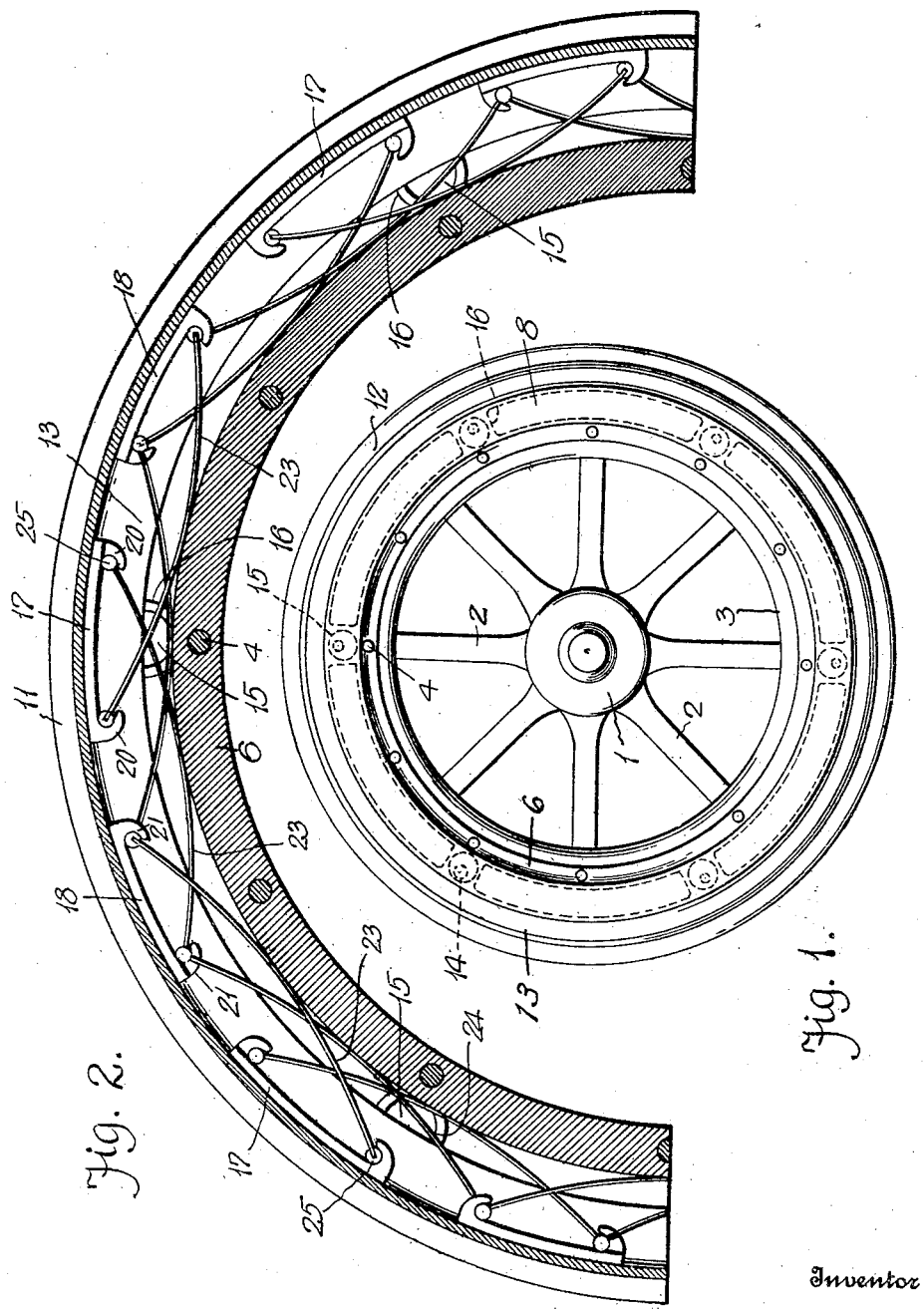

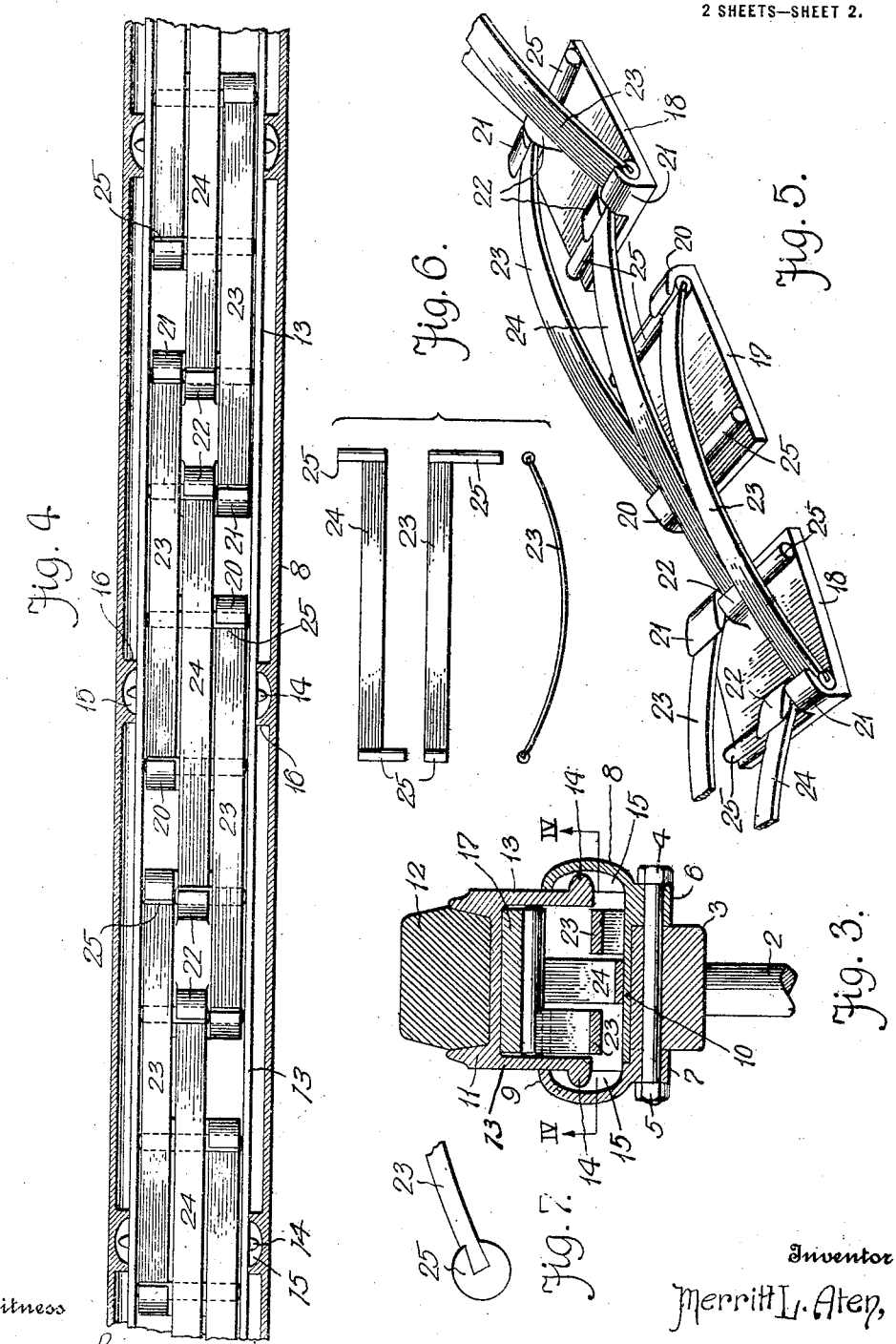

MERRITT L. ATEN, OF JACKSON, MICHIGAN, ASSIGNOR OF ONE-FOURTH TO CHARLES R. LONGSTREET AND ONE-TWELFTH TO A. C. PINEGAR, BOTH OF JACKSON, MICHIGAN.

WHEEL.

1,246,518.  Specification of Letters Patent.  Patented Nov. 13, 1917.

Application filed March 7, 1917. Serial No. 153,073.

*To all whom it may concern:*

Be it known that I, MERRITT L. ATEN, a citizen of the United States of America, residing at Jackson, in the county of Jackson and State of Michigan, have invented certain new and useful Improvements in Wheels, of which the following is a specification, reference being had therein to the accompanying drawings.

This is an improvement in connection with the spring wheel disclosed by my Patent No. 1,117,152, granted Nov. 17, 1914.

In this patent there is shown and described that type of vehicle wheel wherein resilient elements are interposed between the felly of a wheel and the tire thereof, for cushioning the felly relative to the tire, thereby obviating the necessity of using pneumatic tubes for cushioning purposes.

The present invention aims to furnish a wheel of the above type with positive and reliable means, in a manner as hereinafter set forth, for preventing undue circumferential creeping or shifting of the tire member relative to the felly of the wheel, yet permitting of a radial movement of the felly relative to the tire, without any danger of foreign matter interfering with any movement of the felly.

My present invention also includes a mechanical construction wherein the parts are made and assembled with a view of reducing the cost of manufacture and at the same time retain the features by which durability and accessibility are secured. To these ends, the invention resides in the matters to be hereinafter described and claimed, and reference will now be had to the drawing, wherein—

Figure 1 is a side elevation of the wheel in accordance with my invention;

Fig. 2 is an enlarged longitudinal sectional view of a portion of the wheel;

Fig. 3 is a cross sectional view of the same;

Fig. 4 is a developed circumferential section taken on the line IV—IV of Fig. 3;

Fig. 5 is a perspective view of resilient members adapted to form part of the wheel;

Fig. 6 is a plan and elevation of two detached resilient members, and

Fig. 7 is an enlarged elevation of an end of one of the members.

In the drawing, 1 denotes a wheel hub having spokes 2 connected by a felly 3. Connected to the felly 3 by transverse bolts 4, and nuts 5 or other fastening means are the annular flanges 6 and 7 of the inner and outer felly members 8 and 9 respectively. The inner felly member 8 has a band 10 bearing upon the felly 3, and the outer felly member 9 is clamped against the outer side of the felly 3 and against the outer edge of the band 10, as best shown in Fig. 3, said inner and outer felly members coöperating in forming a channel circumferentially of the felly 3.

11 denotes a rim provided with a tire 12. The rim is preferably H shaped in cross section and has the parallel walls 13 thereof provided with spaced outwardly extending lugs 14. These lugs are adapted to extend into radial pockets 15 formed in spaced enlargements 16 on the inner sides of the felly members 8 and 9, as best shown in Fig. 4.

17 and 18 denote holders slidable in the rim 11 said holders being alternately arranged in the rim between the walls 13 thereof. The holders 17 have side abutments 20, while the holders 18 have side and central abutments 21 and 22. All of the abutments are somewhat hook shaped and connecting the side abutments of said holders are side resilient bowed members 23 and connecting the center abutments 22 of the holders 18 are center resilient bowed members 24. Dovetailed upon the ends of the members 23 and 24 are transverse heads 25 and by reference to Fig. 6 it will be noted that the heads 25 of the center members are of an equal length and protrude from opposite sides of said member, while the head at one end of the member 23 corresponds in width to said member, and the head at the opposite end thereof projects from the side of said member and is approximately of a length equal to three widths of said member. The purpose of these heads is to extend to the side edges of the holders 17 and 18, wherever possible and thus prevent the anchored ends of the members 23 and 24 from laterally shifting upon the holders and becoming accidentally disengaged from the abutments thereof. By reference to Figs. 4 and 6, it will be noted that the center resilient bowed members 24 bridge or span the holders 17, and the side resilient bowed members 23 connect the abutments 20 of the holders 17 to abutments 21 of the holders 18. The side and center resilient bowed members therefore have a stepped or staggered relation and the holders 18 can readily shift between the holders 17 with the side and center resilient bowed members 23 and 24 engaging the band 10 of the inner felly member 8, as shown in Fig. 3. The rim 11 is cushioned circumferentially of the felly members, consequently the hub 1 is yieldably held approximately central of the rim. The central portion of the wheel may shift in radial directions, but an excessive circumferential movement of the rim relative to the felly is prevented by the lugs 14 engaging in the pockets 15 of the felly members.

What I claim is:—

A spring action for yieldably supporting the periphery of a wheel relative to the axis thereof, comprising alternately arranged slidable holders, abutments carried by the ends of all of said holders, resilient bowed members having heads engaging the abutments of certain of said holders bridging the intermediate holders, and resilient bowed members having heads engaging abutments on all of said holders whereby all of said resilient bowed members are brought into action by a movement of said holders.

In testimony whereof I affix my signature in the presence of two witnesses.

MERRITT L. ATEN.

Witnesses:
LEWIS E. FLANDERS,
ANNA M. DORR.